May 1, 1928.
E. H. MILLER
CALCULATOR
Filed Dec. 7, 1925
1,667,812
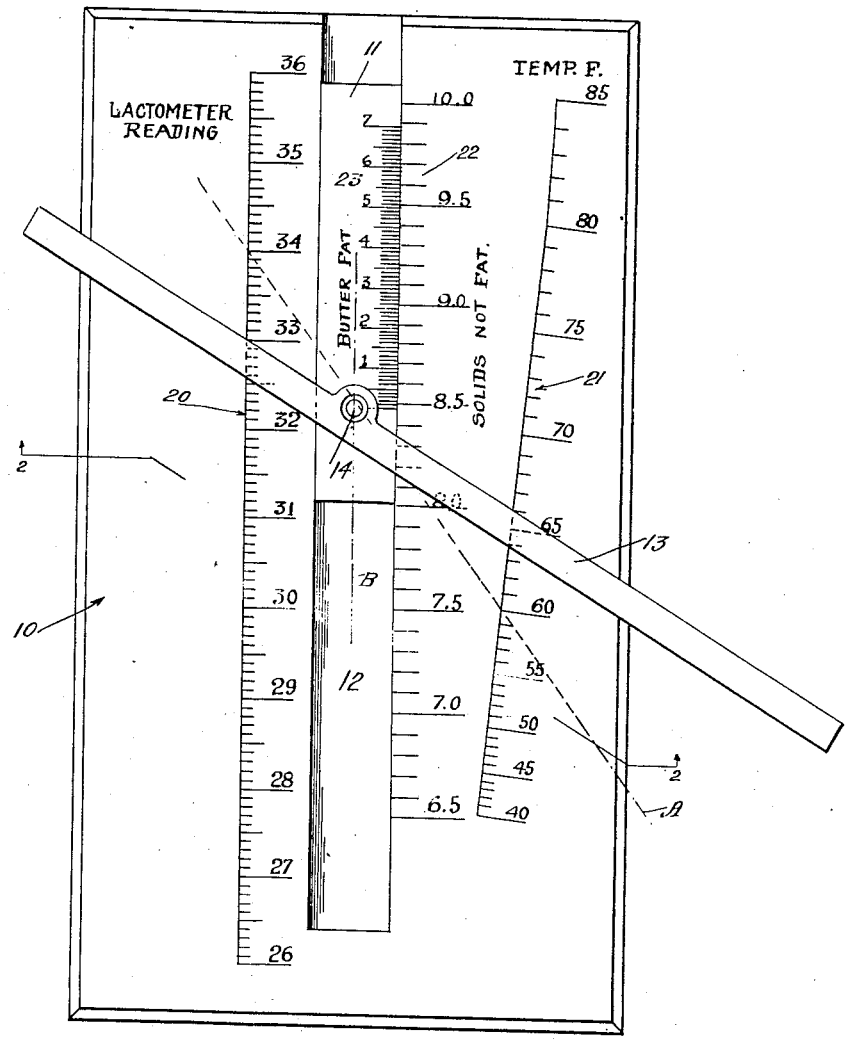
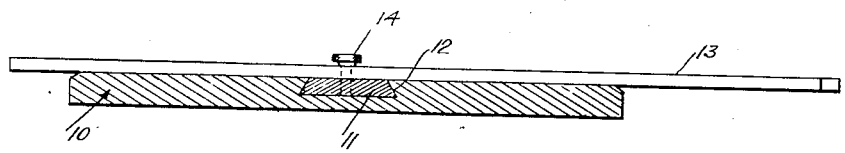
Inventor
Erwin H. Miller.
Attorney.

Patented May 1, 1928.

1,667,812

UNITED STATES PATENT OFFICE.

ERWIN H. MILLER, OF LOS ANGELES, CALIFORNIA.

CALCULATOR.

Application filed December 7, 1925. Serial No. 73,545.

This invention has to do with calculators, and its general object may be stated as the provision of a simple, accurate, readily operated calculator that will perform, with a single setting, two steps of calculation that ordinarily, as for instance with a slide rule, must be performed successively by successive settings of the instrument. A further object is to provide a form of calculator that is readily adapted for certain types of calculations involving one or more operations.

Specifically, although the invention is not at all limited to this particular use, the calculator hereinafter described has been developed for the purpose of readily and accurately calculating the percentage of solids not fat contained in milk. The usually accepted approximate formula for the calculation of solids other than fat is as follows:

Divide by four the Quevenne lactometer reading at 60° F.; and add ⅕ of the butter fat content in percent. For instance, if the lactometer reading at 60° F., is 34 (on a lactometer scale where water is 1000 and the figure 34 means 1034), that lactometer reading is divided by 4, giving 8.5. Assuming the butter fat content to be 4 per cent, then the fraction ⅘ or the figure .80 is added to the figure 8.5, resulting in the final figure 9.3. This calculation in itself is simple enough and easily performed; but the basis on which this calculation is made is the lactometer reading at 60° F. In order to get proper lactometer reading in practice, it is necessary to take both the lactometer reading and the temperature, and then correct the lactometer reading to obtain the proper figure corrected to 60° F. Another operation of a slide rule or reference to a table would be necessary to obtain preliminarily this lactometer reading corrected to 60° F.

The calculator herein described performs both these successive operations at one setting; so that it is necessary only to set the calculator once and read the final result.

The calculation to obtain the percentage of solids not fat in milk is given merely as an illustration of the use of my calculating instrument; and although I proceed to describe the instrument in its specific form as adapted to this specific calculation, it will be readily understood that the invention is not limited thereto. For the purpose of aiding the following specific description, I refer to the accompanying drawings, in which:

Fig. 1 is a face view of the calculator; and

Fig. 2 is a section taken as indicated by line 2—2 on Fig. 1.

Base 10 of the calculator may be of any suitable material. To carry a slider 11 it may preferably have in it a slot 12, of any suitable form to keep the slider in place. The dovetail form shown in Fig. 2 is suitable. On slider 11 is pivotally mounted a straight edge 13, the pivotal point being at 14. The straight edge and slider, like the base, can be of any suitable material. Scale 20 is arranged parallel with the slider movement but scale 21 is arranged at a slight angle to the slider movement and furthermore it is not straight from end to end. Theoretically the line of scale 21 should lie on a continuous curve, but for practical purposes it suffices that it be made up of straight portions.

Thus temperature designation 40 to the temperature designation 80 may lie at one angle to the slider movement, while its extent above the temperature designation 80 may lie at a slightly different angle to the slider movement. This peculiar angular relation of the temperature scale has been adopted to take care of certain characteristics of the equation which is to be calculated. For calculating other equations it will, of course, be apparent that the lactometer and temperature scales or scales for other values may be arranged in other proper relations to the slider movement. And I may furthermore note that although in this particular case member 13 is a straight edge, other equations to be calculated may necessitate member 13 being of some other or different shape, such as curved to a given curvature.

Along one edge of slider slot 12 there is a scale 22 that gives a final reading in percentage, indicating the total amount of solids not fat. The slider itself carries a scale 23 graduated and numbered for percentage of butter fat; and it will be noted that the zero point on this scale comes just on pivotal point 14, and that scale 23 is so graduated with reference to scale 22 that one unit on scale 23 is a little more than equal in length to two-tenths of a unit on scale 22 (the units on both scales being percentages).

If the formula given above were exactly correct, a unit on scale 23 would be exactly equal to two-tenths of a unit on scale 22. The scales here shown are, however, based accurately on tables of which the formula represents only a close approximation. The zero point of scale 23 is illustrated in the drawings, to facilitate the description, although in practice the lower part of the scale, below the lowest butter fat percentage of milk, may be omitted.

Now, to go back to the particular problem before noted, suppose a lactometer reading of milk at 66° F., is found to be 33. Straight edge 13 is then placed in position so that its edge that is in alinement with pivot 14 is on the point 33 of scale 20 and on point 66 of scale 21. In this position it will be noted that pivot point 14 comes approximately opposite the scale reading 8.5 on scale 22. By previous determination the butter fat content of this particular milk has been found to be, let us say, 4 per cent. It is then only necessary with the instrument set as described, to take the reading of scale 22 opposite the figure 4 on scale 23, and the result is then read as approximately 9.28, which means that the total amount of solids not fat in the milk is approximately 9.28 per cent.

From the example given it will be readily seen how the calculator 15 is used for other lactometer and temperature readings. The nature of the general layout of the scale applied to the solution of this particular equation will be best understood when I state that the scale 22 represents in actual figures one quarter of the lactometer reading corrected to 60° F. Thus if the straight edge be placed at one end on the temperature reading 60 and at the other end on any lactometer reading, the resultant reading on scale 22 opposite pivot point 14 will be exactly one quarter of the lactometer reading. Such a position of straight edge 13 is indicated by the dotted line A which has been drawn to pass through lactometer reading 34. It will be noted that this dotted line passes through the dotted line B, representing the path of pivot point 14, just opposite the point designated 8.5 on scale 22. That reading is just one-quarter of the lactometer reading 34. And the same is true of every other position of the straight edge as long as one end is kept at the temperature reading 60. In other positions of the straight edge on other temperature readings, the arrangement of the scale automatically compensates for the difference in temperature, so that scale 22, at the position of pivot 14, reads directly in figures representing one-quarter of the lactometer reading corrected to the temperature 60° F. The scale 22 functions as though it were located directly in the line of movement of pivot 14. It is only for convenience that it is placed to one side of that line. And here I may well say that the relative arrangements of the several scales is more or less arbitrary and may be varied. For instance, it is immaterial on which side of the slider the scale 22 is placed, and the relative arrangements of scales 20 and 21 and the slider and scale 22 may be varied from that shown provided of course that the scales be properly divided to accord with their relative positionings.

For any position of the straight edge and therefore any position of slider 11, scale 23 adds to the figure obtained on the scale 22 an amount equal to a little more than one-fifth the percentage of butter fat. This will be well understood from what has been before stated.

I have found my calculator not only simple as to operation, but accurate as to results. And it will, of course, be readily understood that the calculator may be made, within well understood limits of setting and reading accuracy, to be just as accurate as may be desired. It may be varied in arrangement, scale divisions, etc., to perform other calculations involving two successive operations, or it may be used to perform only such an operation as is here illustrated and typified by the operation of obtaining a figure representing the lactometer reading corrected to a certain temperature (the figure on scale 22 opposite the zero point of scale 23, or opposite pivot 14). Such an operation involves the ascertainment of a value that depends on functions of two other values—in this case, of the lactometer and temperature reading. And it will be readily seen how the device may be arranged and graduated to adapt it to similar operations for other calculations. As an instance I may mention the ascertainment of atmospheric humidity from wet and dry thermometer readings.

I claim:

1. A calculator adapted to solve at a single setting two successive elements of calculation, and embodying a base having thereon two graduations, a slider movable with relation to said graduations, a member adapted to be registered with said two graduations and by which registration the position of the slider is determined, the base and slider having other graduations adapted to be read one against the other.

2. A calculator adapted to solve at a single setting two successive elements of a calculation, and embodying a base having thereon two graduations, a slider movable with relation to said calibrations, a straight edge pivotally mounted on the slider with its edge in line with its pivotal point, said straight edge adapted to be registered with both said graduations, another graduation on the base, and a graduation on the slider arranged thereon with a starting point at the pivotal point of said straight edge, and the slider graduation and said last mentioned base graduation being adapted to read one against the other.

3. A calculator adapted to solve at a single setting two successive elements of a calculation, and comprising a base with two spaced graduations thereon and a slider guide between said graduations, a slider in said guide, a straight edge pivoted on said slider with its edge in line with its pivotal point, said straight edge adapted to be registered with both said graduations and by such registration to determine the position of the slider, another graduation on the base near the edge of the slider guide, and a graduation on the slider arranged thereon with a starting point at said pivotal point of the straight edge, said slider graduation and said last mentioned base graduation adapted to be read one against the other.

In witness that I claim the foregoing I have hereunto subscribed my name this 20th day of November, 1925.

ERWIN H. MILLER.